Figure 1:
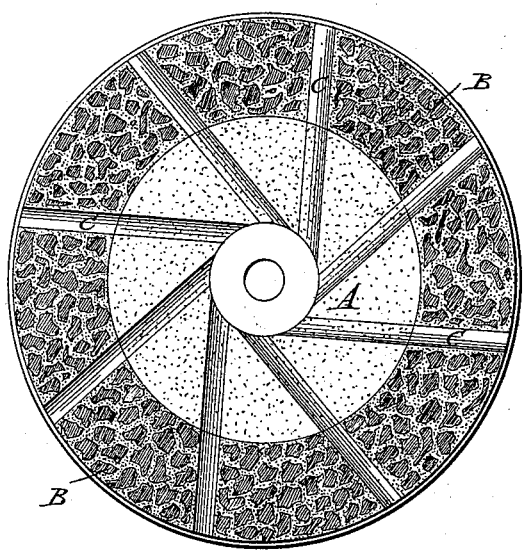

(No Model.)

T. L. STURTEVANT.
MILLSTONE.

No. 550,300. Patented Nov. 26, 1895.

Witnesses:

Inventor,
Thomas L. Sturtevant,
by his attorneys
Baldwin Davidson & Wight.

UNITED STATES PATENT OFFICE.

THOMAS L. STURTEVANT, OF QUINCY, MASSACHUSETTS.

MILLSTONE.

SPECIFICATION forming part of Letters Patent No. 550,300, dated November 26, 1895.

Application filed October 3, 1893. Serial No. 487,100. (No model.)

*To all whom it may concern:*

Be it known that I, THOMAS L. STURTEVANT, a citizen of the United States, residing at Quincy, in the county of Norfolk and State of Massachusetts, have invented certain new and useful Improvements in Millstones, of which the following is a specification.

My invention relates particularly to composite millstones in which blocks or lumps of emery are embedded in binding material. Letters Patent of the United States have been granted to me in which small irregular lumps of emery were embedded in metal, such as cast-iron. Such a millstone is shown, for instance, in my Patent No. 452,959, of May 26, 1891. In Letters Patent of the United States No. 406,954, granted to C. J. Potter July 16, 1889, a composite millstone is shown in which small irregular lumps of emery are embedded in Portland cement. Both of these millstones, while very efficient for certain kinds of work, do not give perfect satisfaction when used for grinding grain. When the blocks of emery are bound together by Portland cement or any mixtures of this nature, the cement between the blocks is soon washed out to a damaging extent and the stone is rendered inefficient. Where metal is employed, the filling between the blocks or lumps does not wear away rapidly enough to expose the edges of the lumps of emery, and the face of the stone becomes too smooth to effectively grind grain. If the emery blocks are made very small, they are not held by the cement strongly enough, but become loose and pull out.

By my improvements I have produced an emery-millstone for grinding grain that always keeps sharp and that is strong, durable, and efficient.

According to my invention I embed the blocks of emery in a mortar made of a suitable cementing material, with which is mixed emery-sand or other very hard sand. By mortar I mean a mixture, for instance, of such materials as lime, hair, and sand, commonly called "mortar." The mortar which I preferably employ consists of a composition of a suitable cement or glue and a very hard sand, such as emery-sand. In this mortar the emery blocks or lumps are embedded.

When the millstone is hardened either by time or fire, as in the usual process, and the stone put into use, the emery-sand protects the cementing material in which the blocks or lumps of emery are set, and it does not in grain-grinding work out too much between the blocks of emery, but is worn away sufficiently to expose the sharp edges of the emery blocks in the most effective manner. The sharp emery-sand cuts the grain before it can take hold of the cement, and thus prevents the cement from being cut out too rapidly. The large blocks of emery give the stone the requisite strength to resist shocks and hold it together, as well as affording grinding surfaces and edges.

In the manufacture of my improved composite millstone I find it most expedient to place rock-emery sections or segments around a stone eye to form the skirt and place stone, metal, or wood furrows radially between the sections and bind the whole together by a metallic band or bands. I may also make the entire stone of lumps of emery and binding material, or make the skirt of rock-emery surrounding a stone or metal eye without the use of furrow-strips.

Figure 2:
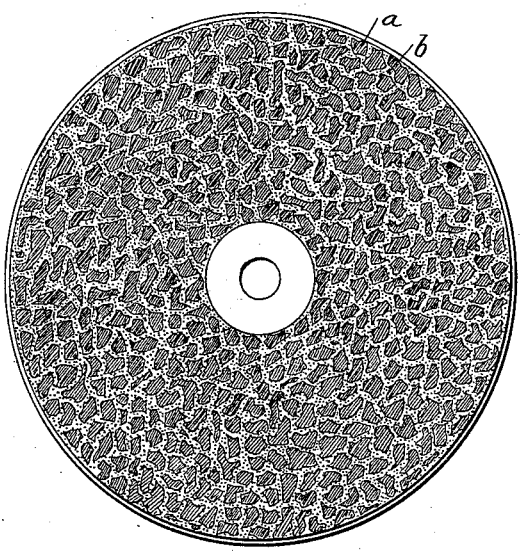
Figure 3:
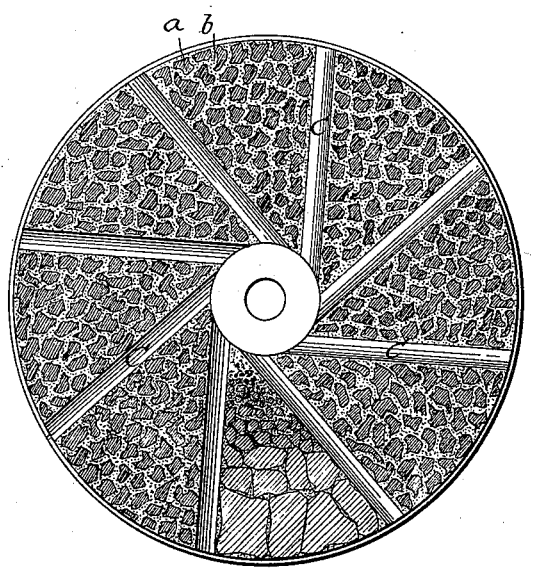
Figure 4:
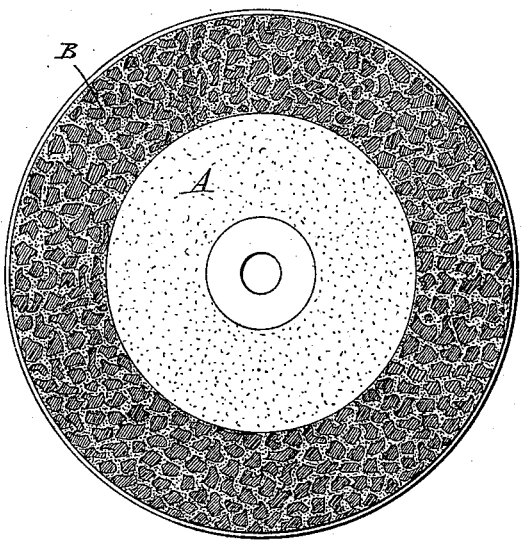

In the accompanying drawings, illustrating my invention, Figure 1 is a plan view of a millstone in which the bosom is made of stone and the skirt of segments or sections made up of lumps of emery and my improved mortar or binding material with furrow-strips radiating from the eye to the periphery of the skirt. Fig. 2 shows a plan view of a millstone in which the bosom and skirt are both made of lumps of emery and binding material and no furrow-strips are employed. Fig. 3 is a plan view of a millstone in which the bosom and skirt are made of lumps of emery embedded in mortar and in which furrow-strips are employed. Fig. 4 is a plan view of a millstone in which the bosom is made of stone or concrete and the skirt of lumps of emery embedded in mortar or binding material.

In Fig. 1, A indicates the bosom, which may be made of burr-stone or other suitable stone. B. indicates the skirt, which is composed of sections or segments made up of small irregular lumps of emery embedded in a mortar composed of a suitable cement or glue and a very hard sand, such as emery-sand. The furrow-strips C may be made of stone, metal, or wood.

In Fig. 2 the bosom and skirt are made of small irregular lumps or blocks of emery $a$, embedded in a mortar or binding agent $b$.

In Fig. 3 the bosom and skirt are made as above described with reference to Fig. 2, while furrow-strips C, of metal, stone, or wood, radiate from the eye to the circumference of the skirt.

In Potter's United States Patent No. 406,954, above referred to, the millstone is formed of blocks of emery increasing in size from the skirt to the eye. I have found that the construction is very much improved by placing the larger blocks of emery near the periphery and causing the blocks to diminish in size from the periphery to the eye, where quite small pieces and even sand may be employed. Such a construction is shown at the sector X in Fig. 3.

As the millstone near the periphery travels faster than the stone near the eye, there is more wear in a given time on the blocks of emery and cement near the periphery than near the eye. I therefore use the larger blocks of emery near the periphery and the smaller blocks near the eye, and therefore have less cement near the periphery than near the eye.

It should be understood that the cement is softer than the emery and wears away faster; but by reducing the relative proportion of cement at the periphery and increasing the area of the emery-rock, I equalize the wear, so that the entire stone presents at all times an even grinding-surface. Another important reason for arranging the blocks of emery as above specified is that in the process of grinding as the material approaches the periphery of the stone it becomes finer, and if the blocks of emery were small there would be a large number of interstices between them filled with softer material, and always somewhat lower than the emery-face. Through these spaces the finer material escapes, and the finest grinding is not then possible; but by arranging comparatively large blocks of emery at the periphery a hard grinding-face of an increased area is presented, and the material in its pulverized or granulated state is reduced to the desired degree. Furthermore, if the larger stones or blocks were arranged near the eye the necessary number of furrows could not be obtained; but by arranging the smaller lumps near the eye and the large ones near the periphery numerous furrows or grooves are provided at the eye, (where numerous sharp edges are required for grinding and numerous grooves are necessary for the escape of material,) while at the skirt the large lumps permit of a harder wearing-surface and yet provide a sufficient number of grooves or furrows to allow the escape of the material, which more readily escapes near the skirt.

In Fig. 4 the bosom A is of stone or of concrete composed of emery and cement, or the concrete may consist of any suitable stone mixed with strong cementing material. It is impracticable to make the bosom of large blocks of rock-emery, for this is too strong to be picked down by the mill-picks. As the bosom requires some time to be dressed down, it must be formed of material capable of being dressed away easily.

The skirt B in Fig. 4 may be made of lumps of emery and a mortar such as above described. In this instance no furrow-strips are shown, though they might be used.

It will be understood that I do not herein claim, broadly, the combination of small irregular lumps of emery and a binding agent or material, such as metal or Portland cement; but my present invention is founded on the discovery that a mortar comprising in its formation a hard sand, such as emery-sand, prevents the binding material from wearing away too rapidly, acts upon the grain to cut it and reduce it to a certain extent, and co-operates with the lumps of emery to grind the grain or similar material to the desired degree.

I claim as my invention—

1. A mill stone composed of lumps of emery set in a binding mortar composed of a cement mixed with hard sand, such as emery sand, and lumps or blocks of emery decreasing in size from the periphery of the stone to the eye.

2. A mill stone composed of lumps of stone set in a binding material, the lumps or blocks of stone being arranged to decrease in size from the periphery of the mill stone toward the eye.

In testimony whereof I have hereunto subscribed my name.

THOMAS L. STURTEVANT.

Witnesses:
W. H. ELLIS,
EDWARD H. MASON.